United States Patent
Kwon et al.

(10) Patent No.: US 8,538,390 B2
(45) Date of Patent: Sep. 17, 2013

(54) COMMUNICATION SYSTEM, APPARATUS AND METHOD FOR PROVIDING CALL STATE THEREOF

(75) Inventors: Soon Hyun Kwon, Yongin-si (KR); Yo Sun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 12/897,194

(22) Filed: Oct. 4, 2010

(65) Prior Publication Data

US 2011/0081925 A1   Apr. 7, 2011

(30) Foreign Application Priority Data

Oct. 6, 2009 (KR) .................. 10-2009-0094596

(51) Int. Cl.
*H04M 3/42* (2006.01)

(52) U.S. Cl.
USPC ............. 455/414.2; 455/414.1; 455/456.1; 455/456.5; 455/456.6; 455/466

(58) Field of Classification Search
USPC .......... 455/414.1, 414.2, 456.1, 456.2, 456.3, 455/418, 461, 550.1, 456.5, 566, 417, 517, 455/567, 404.1, 466; 709/202, 203, 204, 709/249, 206, 207

See application file for complete search history.

(56) References Cited

U.S. PATENT DOCUMENTS

| 8,078,191 | B2 * | 12/2011 | Laflamme et al. | 455/456.1 |
| 8,200,755 | B2 * | 6/2012 | Fujimoto et al. | 709/204 |
| 2003/0069934 | A1 * | 4/2003 | Garcia-Martin et al. | 709/206 |
| 2004/0003037 | A1 * | 1/2004 | Fujimoto et al. | 709/203 |
| 2008/0208953 | A1 * | 8/2008 | Tian | 709/201 |
| 2009/0183236 | A1 * | 7/2009 | Ben-Ezra et al. | 726/4 |
| 2009/0245499 | A1 * | 10/2009 | Wada et al. | 379/212.01 |
| 2010/0332597 | A1 * | 12/2010 | Varney | 709/204 |

* cited by examiner

*Primary Examiner* — Jean Gelin
(74) *Attorney, Agent, or Firm* — Jefferson IP Law, LLP

(57) ABSTRACT

A communication system, an apparatus, and a method for providing a call state thereof are provided. The method for providing a call state of a communication system, supporting communication over a mobile communication network and an interne network, includes, when presence of mobile call execution changes through a base transceiver station over the mobile communication network, notifying the presence of mobile call execution to an Instant Messaging/Presence Service (IM/PS) server managing presence of interne call execution over the interne network by a User Equipment (UE), and sending the presence of mobile call execution to another UE by the IM/PS server.

13 Claims, 6 Drawing Sheets

COMMUNICATION SYSTEM, APPARATUS AND METHOD FOR PROVIDING CALL STATE THEREOF

PRIORITY

This application claims the benefit under 35 U.S.C. §119(a) of a Korean patent application filed on Oct. 6, 2009 in the Korean Intellectual Property Office and assigned Serial No. 10-2009-0094596, the entire disclosure of which is hereby incorporated by reference.

BACKGROUND OF THE INVENTION

1. Field of the Invention

The present invention relates to a communication system, and a communication apparatus and a communication method thereof. More particularly, the present invention relates to a communication system performing communication over a mobile communication network and an internet network, and an apparatus and a method for providing a call state thereof.

2. Description of the Related Art

In general, Instant Messaging/Presence Service (IM/PS) means a service that provides state information for determining states of presentities such as physical positions, communication states, or communication media to watchers. Namely, in a communication system, watchers may determine states of presentities from the state information, and communicate with the presentities using respective User Equipments (UEs). In this case, the communication system provides the IM/PS through an internet network. Accordingly, to use the IM/PS by an UE, presentities and watchers should use an UE accessible to the internet network. Namely, the communication system provides states of the presentities through an internet network. However, the foregoing communication system has a problem that cannot determine states of presentities in a cellular network. For this reason, because the communication system does not provide state information of presentities over the cellular network, watchers cannot determine states of the presentities. For example, the watchers cannot determine communication states of the presentities, namely, presence of call execution. Accordingly, the watchers have a difficulty in communicating with the presentities using an UE.

SUMMARY OF THE INVENTION

An aspect of the present invention is to address at least the above mentioned problems and/or disadvantages and to provide at least the advantages described below. Accordingly, an aspect of the present invention is to provide a communication system performing communication through a mobile communication network and an internet network, and an apparatus and a method for providing a call state thereof.

In accordance with an aspect of the present invention, a method for a call state of a communication system supporting communication over a mobile communication network and an internet network is provided. The method includes, when presence of mobile call execution changes through a base transceiver station over the mobile communication network, notifying the presence of mobile call execution to an instant messaging/presence service server managing presence of internet call execution over the internet network by a user equipment, and sending the presence of mobile call execution to another user equipment by the instant messaging/presence service server.

In accordance with an aspect of the present invention, a method for providing a call state of a communication system is provided. The method further includes, when presence of internet call execution changes through an access point supporting communication over the internet network, notifying the presence of internet call execution to the instant messaging/presence service server by the user equipment; and sending the presence of internet call execution to another user equipment by the instant messaging/presence service server.

In accordance with another aspect of the present invention, a method for providing a call state of a user equipment in a communication system supporting communication over a mobile communication network and an internet network is provided The method includes, when a mobile call is connected through a base transceiver station over the mobile communication network, notifying the mobile call connection to an instant messaging/presence service server managing presence of internet call execution over the internet network, and sending a cancellation of the mobile call to the instant messaging/presence service server when the mobile call is canceled.

In accordance with another aspect of the present invention, a communication system supporting communication over a mobile communication network and an internet network is provided. The communication system includes base transceiver stations for supporting communication over the mobile communication network, access points for supporting communication over the internet network, User Equipments (UEs) for executing a mobile call through the base transceiver stations and an internet call through the access points, and an instant messaging/presence service server for managing presences of mobile call execution and internet call execution of the user equipments that allows the user equipments to share the presences of mobile call execution and internet call execution.

In accordance with another aspect of the present invention, an apparatus for providing a call state of a user equipment in a communication system supporting communication over a mobile communication network and an internet network is provided. The apparatus includes a mobile communication unit for executing a mobile call through a base transceiver station for supporting communication over the mobile communication network, a state communication unit for communicating presence of the mobile call execution with an instant messaging/presence service server managing presence of the internet call execution over the internet network, and a controller for controlling the instant messaging/presence service server to notify the presence of the mobile call execution when the presence of the mobile call execution changes.

In accordance with another aspect of the present invention, an apparatus for providing a call state of an instant messaging/presence service server in a communication system supporting communication over a mobile communication network and an internet network is provided. The apparatus includes a state communication unit for detecting whether user equipments execute a mobile call through a base transceiver station supporting communication over the mobile communication network; an internet unit for detecting whether user equipments execute an internet call through an access point supporting communication over the internet network, and a controller for managing presence of the mobile call execution of the user equipments to share the presence of the mobile call execution by the user equipments and managing presence of the internet call execution of the user equipments to share the presence of the internet call execution by the user equipments.

Therefore, a communication system performing communication through a mobile communication network and an internet network, and an apparatus and a method for providing a call state thereof enable UEs to share presence of mobile call execution of the UEs as well as presence of internet call execution thereof are provided. Due to this, the UE may easily determine a state of another UE to use for determining whether to request an internet call or a mobile call from another UE. Accordingly, since the UE can reduce the number of unnecessary internet call or mobile call connection requests, it can improve use efficiency thereof.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the term "state information" means information for confirming states of presentities, for example a physical position, a communication state, and a communication medium in a communication system capable of providing an Instant Messaging/Presence Service (IM/PS). As used herein, the term "call state" means communication states of presentities, namely, presence of call execution of a User Equipment (UE) in a communication system. That is, the call state presents call connection or call cancellation of the UE. As used herein, the term "internet call" means a call executable over an internet network including an intranet network in a communication system using the internet network. As used herein, the term "mobile call" means a call executable in a communication system using a mobile communication network.

Figure 1:
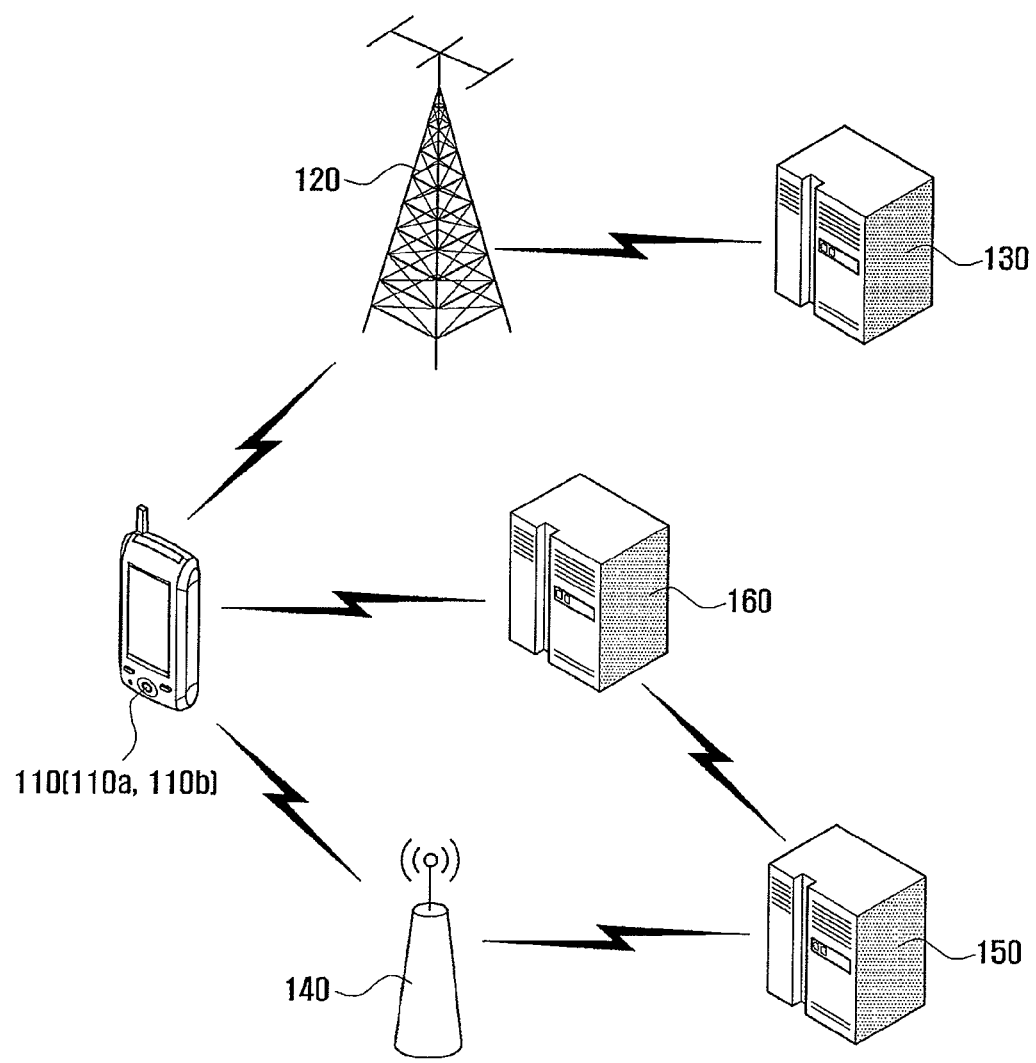
FIG. 1 is a view illustrating a configuration of a communication system according to an exemplary embodiment of the present invention.

FIG. 1 is a view illustrating a configuration of a communication system according to an exemplary embodiment of the present invention. In this case, this embodiment is described assuming that a communication system uses a mobile communication network and an internet network. Here, the mobile communication network may be supported in a Code Division Multiple Access (CDMA) scheme or a Global System for Mobile communication (GSM) scheme. Further, the internet can be supported in a Wireless Broadband (WiBro) scheme or a Wireless Local Area Network (WLAN) scheme.

Referring to FIG. 1, the communication system according to this exemplary embodiment includes a UE 110 (110a, 110b), a Base Transceiver Station (BTS) 120, a Base Station Controller (BSC) 130, an Access Point (AP) 140, an internet Protocol Private Branch eXchange (IP-PBX) 150, and an IM/PS server 160.

The UEs 110 (110a, 110b) access a mobile communication network through the BTS 120 to communicate with each other. The BSC 130 manages and controls the BTS 120, and controls a mobile call between the UEs 110 (110a, 110b). At this time, the UEs 110 (110a, 110b) may connect with each other through the BTS 120 and the BSC 130 to execute the mobile call. Further, the UEs 110 (110a, 110b) access an internet network through the AP 140 to communicate with each other. The IP-PBX 150 manages and controls the AP 140, and controls an internet call between the UE (110; 110a, 110b). At this time, the UEs 110 (110a, 110b) may connect with each other through the AP 140 and the IP-PBX 150 to execute an internet call like Voice over Internet Protocol (VoIP) exchange. The IM/PS server 160 manages respective state information of the UEs 110 (110a, 110b) such that the UEs 110 (110a, 110b) share it with each other. In this case, the state information includes presence of mobile call execution or internet call execution of the UE 110.

Figure 2:
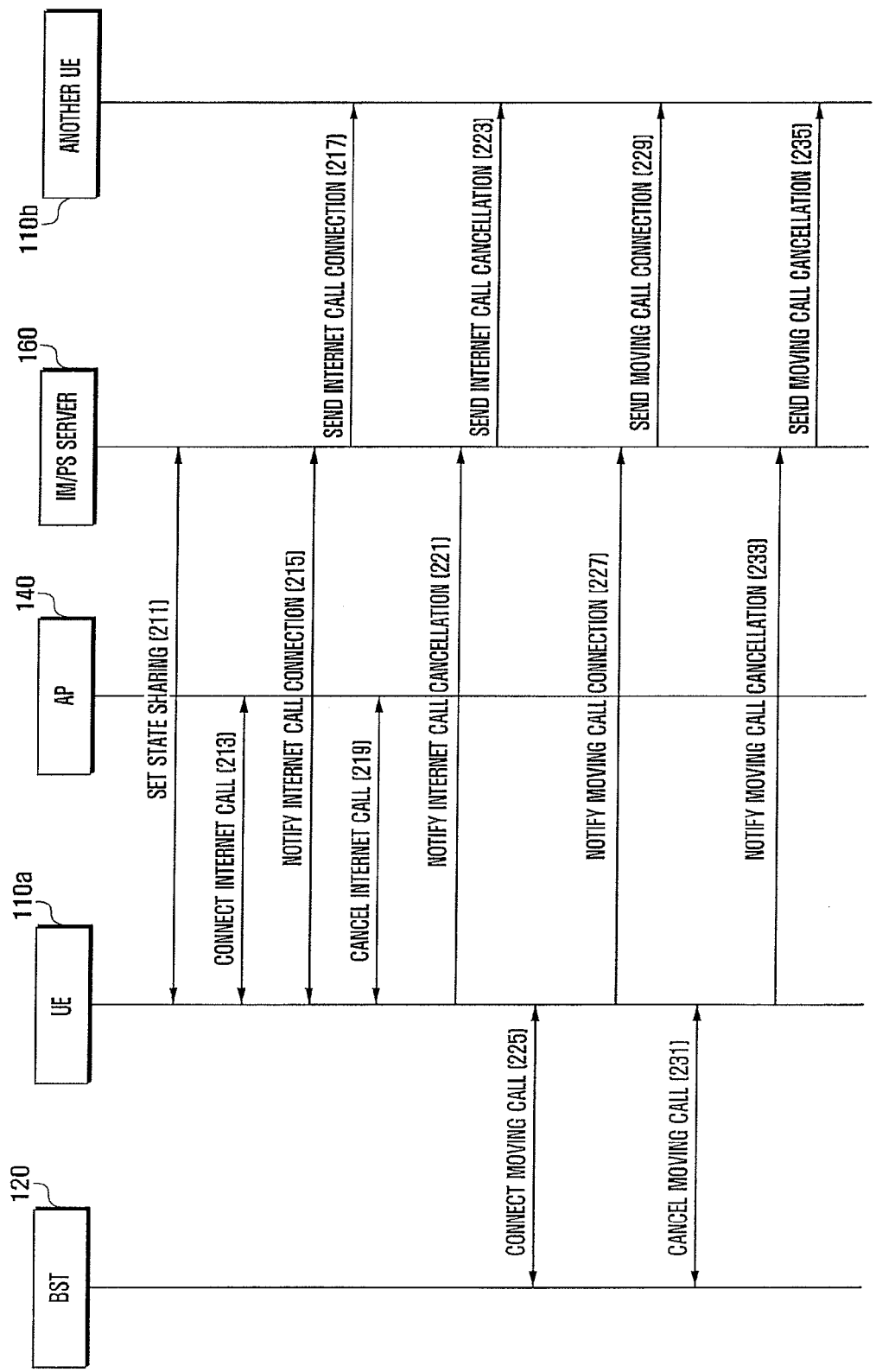
FIG. 2 is a scheme diagram illustrating a method for providing a call state of a communication system according to an exemplary embodiment of the present invention.

FIG. 2 is a scheme diagram illustrating a method for providing a call state of a communication system according to an exemplary embodiment of the present invention.

Referring to FIG. 2, in the method for providing a call state of a communication system of this exemplary embodiment, an IM/PS server 160 firstly sets state sharing of a UE 110a at step 211. Namely, the UE 110a performs setting for sharing state information into an IM/PS server 160 with another UE 110*b*. In this case, the state sharing of another UE 110*b* can be previously set in the IM/PS server 160.

Next, after setting the sharing state information to the IM/PS server 160 at step 211, when an internet call is connected through an AP 140 at step 213, the UE 110*a* notifies the internet call connection to the IM/PS server 160 at step 215. Next, the IM/PS server 160 sends the internet call connection of the UE 110*a* to another UE 110*b* at step 217. Through this, the other UE 110*b* can determine that internet call connection is achieved in the UE 110*a* based on the state information, and can determine that different internet call connection is then impossible to the UE 110*a*. That is, although internet call connection for the UE 110*a* is requested, because a different internet call connection is then impossible, another UE 110*b* can determine not to request the internet call.

Subsequently, when the internet call is canceled at step 219, the UE 110*a* notifies the internet call cancellation to the IM/PS server at step 221. Subsequently, the IM/PS server 160 sends the internet call cancellation of the UE 110*a* to another UE 110*b* using state information at step 223. Through this, another UE 110*b* can determine that internet call cancellation is achieved in the UE 110*a* and different internet call connection is then possible to the UE 110*a*. Namely, when internet call connection for the UE 110*a* is requested, because a different internet call connection is then possible, another UE 110*b* can determine to proceed with the internet call request.

Meanwhile, after setting the sharing state information to the IM/PS server 160 at step 211, a mobile call is connected through a BTS 120 at step 225, and the UE 110*a* notifies the mobile call connection to the IM/PS server 160 at step 227. Next, the IM/PS server 160 sends the mobile call connection of the UE 110*a* to another UE 110*b* using state information at step 229. Through this, another UE 110*b* may determine that the mobile call connection is achieved in the UE 110*a* based on state information, and determine that different mobile call connection is then impossible in the UE 110*a*. That is, although mobile call connection for the UE 110*a* is requested, because a different mobile call connection is then impossible, another UE 110*b* can determine not to request the mobile call.

Next, when the mobile call is canceled at step 231, the UE 110*a* notifies the mobile call cancellation to the IM/PS server 160 at step 233. Subsequently, the IM/PS server 160 sends the mobile call cancellation of the UE 110*a* to another UE 110*b* using state information at step 235. Through this, another UE 110*b* can determine that the mobile call cancellation is achieved in the UE 110*a*, and that a different mobile call connection is then possible in the UE 110*a* based on the state information. Namely, when the mobile call connection for the UE 110*a* is requested, because a different mobile call connection is possible, another UE 110*b* can determine that it may then request the mobile call request.

Figure 3:
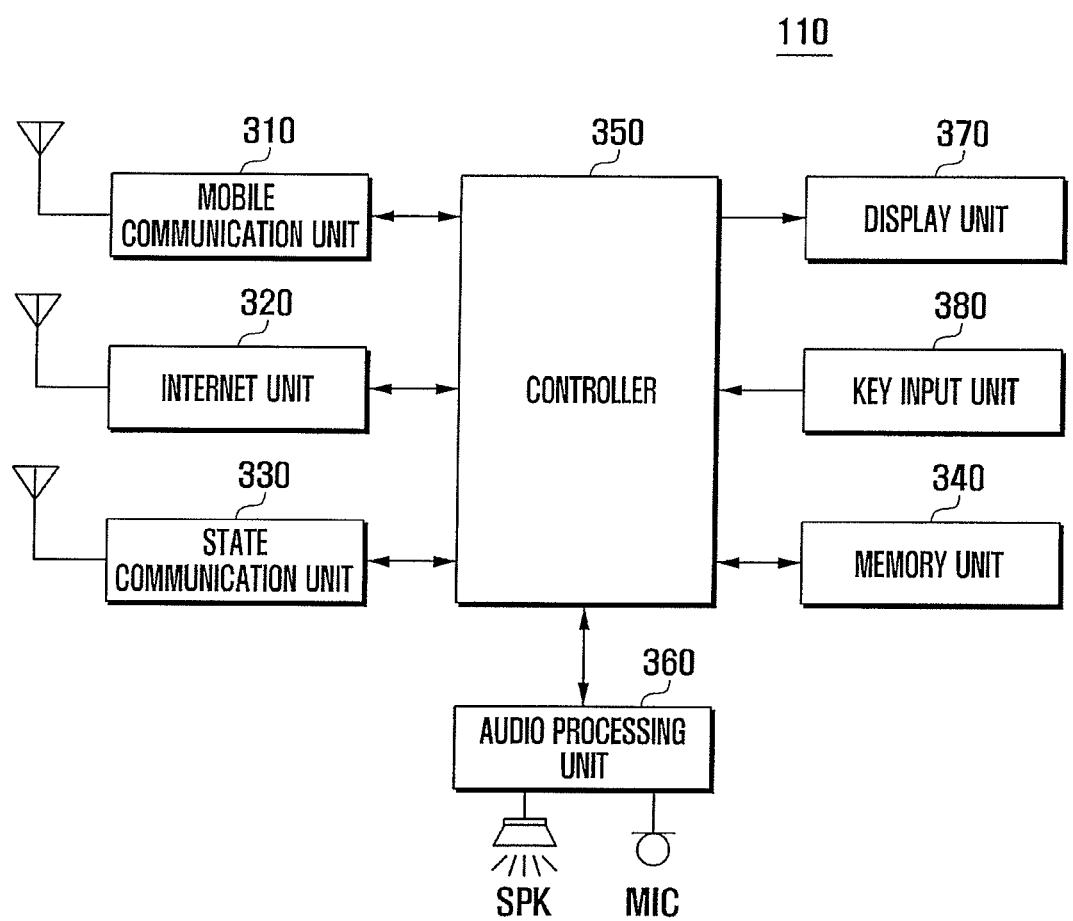
FIG. 3 is a block diagram illustrating a user equipment of a communication system according to an exemplary embodiment of the present invention.

FIG. 3 is a block diagram illustrating a UE of a communication system according to an exemplary embodiment of the present invention. In this case, this exemplary embodiment is explained assuming that the UE terminal is a dual mode terminal performing communication over a mobile communication network and an internet network. Further, this exemplary embodiment is described assuming that the UE is a portable terminal.

Referring to FIG. 3, the UE 110 of this exemplary embodiment includes a mobile communication unit 310, an internet unit 320, a state communication unit 330, a memory unit 340, a controller 350, an audio processing unit 360, a display unit 370, and a key input unit 380.

The mobile communication unit 310 executes a mobile communication function of the UE 110. The mobile communication unit 310 includes a mobile transmitter up-converting a frequency of a transmitted signal and amplifying the signal, and a mobile receiver low-noise-amplifying a received signal and down-converting the signal (not shown). The mobile communication unit 310 supports interface between the UE 110 and the BTS 120, and enables mobile call exchange over a mobile communication network.

The internet unit 320 executes an internet communication function of the UE 110. In this case, the internet unit 320 includes an internet transmitter converting a transmitted signal into packets, and an internet receiver converting received packets into a signal (not shown). The internet unit 320 supports interface between the UE 110 and the AP 140, and enables internet call exchange over the internet network.

The state communication unit 330 executes a state sharing function of the UE 110. The state communication unit 330 supports interface between the UE 110 and the PM/PS server 160 and enables call state sharing according to an exemplary embodiment of the present invention.

The memory unit 340 may be configured by a program memory and a data memory (not shown). The program memory stores programs for controlling a general operation of the UE 110. The program memory may store programs for providing a call state according to an exemplary embodiment of the present invention. The data memory executes a function storing data created during execution of the programs.

The controller 350 executes a function controlling overall operations of the UE 110. At this time, the controller 350 includes a data processor having a transmitter encoding and modulating a transmitted signal and a receiver demodulating and decoding a received signal (not shown). Here, the data processor can be configured by a modem and a codec. Further, the codec includes a data codec processing packets and an audio codec processing audio signals such as voices. The controller 350 can execute a mobile call through the mobile communication unit 310. The controller 350 may execute an internet call through the internet unit 320. Moreover, the controller 350 can notify a presence of internet call execution to the IM/PS server 160 through the internet unit 320. In addition, the controller may notify a presence of mobile call execution to the IM/PS server 160 through the state communication unit 330.

The audio processing unit 360 plays a received audio signal output from the audio codec of the data processor through a speaker SPK or transmits an audio signal to be transmitted from a microphone MIC to the audio codec of the data processor. The display unit 370 displays user data output from the controller 350. The display unit 370 can use a Liquid Crystal Display (LCD) (not shown). In this case, the display unit 370 may include an LCD controller, a memory storing image data, and an LCD element. At this time, the LCD is implemented in a touch screen scheme, and it can also operate as an input unit.

The key input unit 380 includes keys inputting numeric and character information, and function keys setting all types of functions (not shown).

Figure 4:
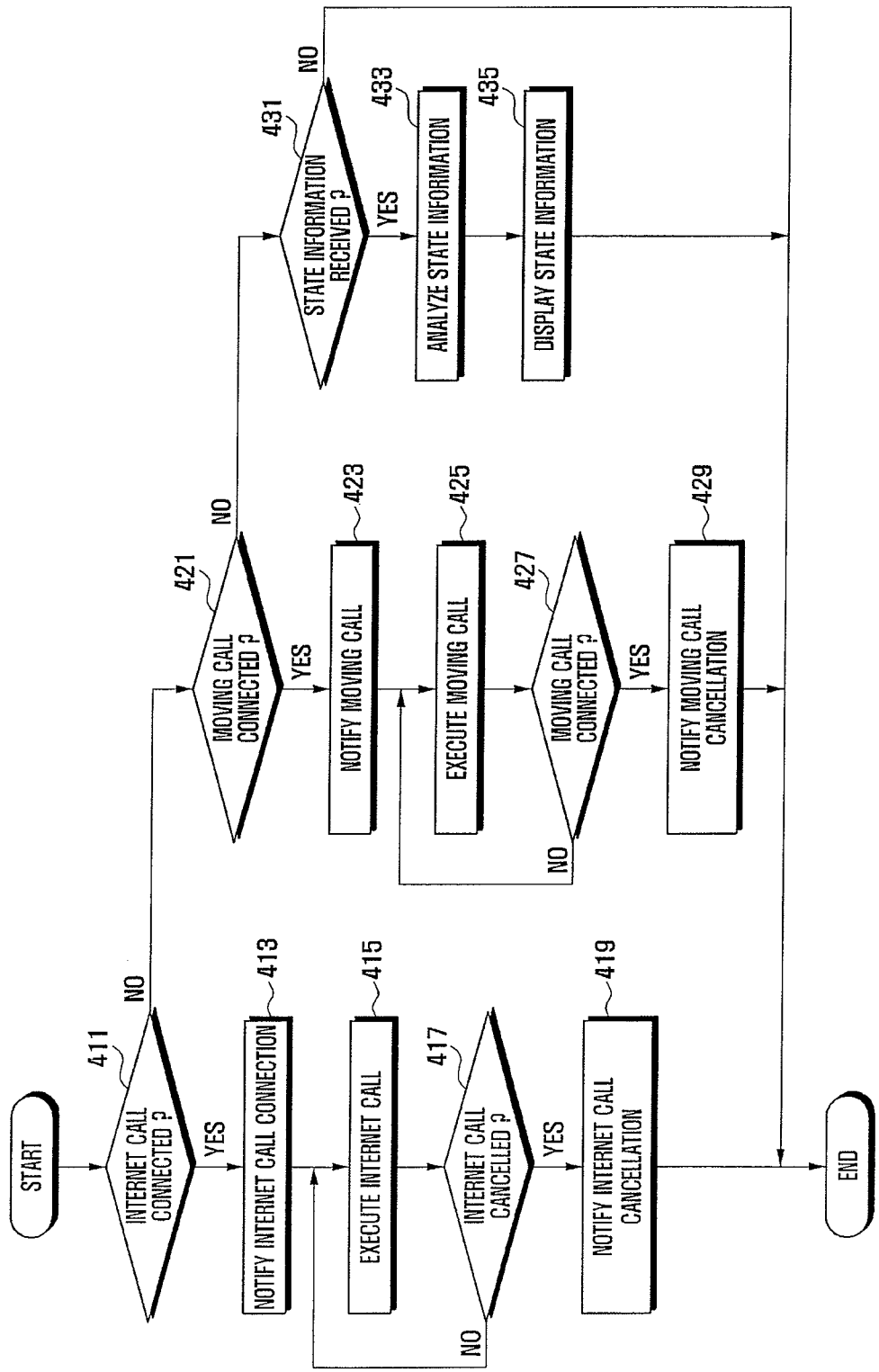
FIG. 4 is a flowchart illustrating a method for providing a call state of a communication system according to an exemplary embodiment of the present invention.

FIG. 4 is a flowchart illustrating a method for providing a call state of a communication system according to an exemplary embodiment of the present invention.

Referring to FIG. 4, in the method for providing a call state of a communication system according to this exemplary embodiment, a controller 350 first detects internet call connection through an internet unit 320 at step 411.

At this time, the controller 350 may transmit an internet call connection request to an AP 140 and receive the internet call connection request from the AP 140 in an accessing state to the AP 140. When an internet call is permitted, internet call connection for a UE 110 can be achieved. Next, the controller 350 notifies the internet call connection to an IM/PS server 160 through an internet unit 320 at step 413. At this time, the controller 350 may directly notify the internet call connection to the IM/PS server 160.

Subsequently, the controller 350 executes an internet call through the internet unit 320 at step 415. At this time, the controller 350 may exchange a sound packet with the AP 140 in a state that the internet call is connected to the AP 140. When an internet call is cancelled during execution of the internet call at step 417, the controller 350 detects it and notifies the internet call cancellation to the IM/PS server 160 through the internet unit 320 at step 419. At this time, in a state accessing the AP 140, the controller 350 may cancel an internet call, or the internet call can be canceled by the AP 140. Further, the controller 350 may directly notify the internet call cancellation to the IM/PS server 160.

Meanwhile, mobile call connection can be achieved in the UE 110 in a state that the internet call connection is not detected at step 411. That is, when a mobile call is connected through a mobile communication unit 310 at step 421, the controller 350 detects it and notifies the mobile call connection to the IM/PS server 160 through the state communication unit 330 at step 423. At this time, in a state accessing a BTS 120, the controller 350 may transmit a mobile call connection request to the BTS 120 and receive the mobile call connection request from the BTS 120. Furthermore, when the mobile call is permitted, mobile call connection for the UE 110 may be achieved.

Subsequently, the controller 350 executes the mobile call through the mobile communication unit 310 at step 425. At this time, in a state that the mobile call is connected with the BTS 120, the controller 350 may exchange a voice signal with the BTS 120. Further, when the mobile call is canceled during execution of the mobile call at step 427, the controller 350 detects it and notifies the mobile call cancellation to the IM/PS server 160 at step 429. At this time, in a state accessing the BTS 120, the controller 350 may cancel the mobile call or the mobile call can be canceled by the BTS 120.

In the meantime, in a state that the internet call connection is not detected at step 411 and the mobile call connection is not detected at step 421, state information can be sent to the UE 110. Namely, the state information is received through an internet unit 320 or the state communication unit 330, the controller 350 detects it at step 431, and analyzes the state information at step 433. Subsequently, the controller 350 displays state information according to analysis results at step 435.

At this time, the controller 350 may determine that the state information received through the internet unit 320 indicates presence of internet call execution of another UE. Furthermore, the controller 350 may determine whether an internet call is connected to another UE or is canceled. Moreover, since the controller 350 enables the internet call connection to another UE, it can determine whether an internet call connection request is performed through the AP 140. In addition, the controller 350 can determine that the state information received through the state communication unit 320 is to indicate presence of mobile call execution of another UE. The controller 350 may determine whether the mobile call is connected to another UE or is cancelled. Further, because the controller 350 enables mobile call connection to another UE, it can determine whether a mobile call connection request is performed through the BTS 120.

Figure 5:
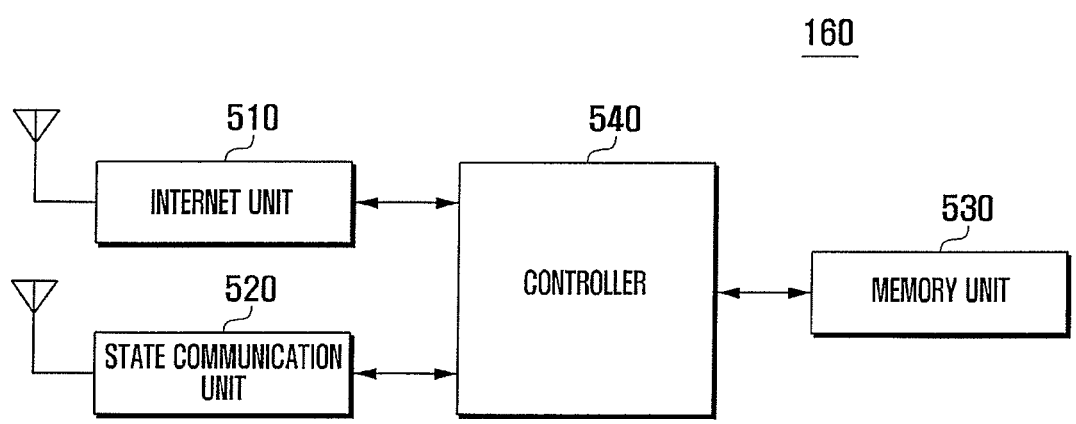
FIG. 5 is a block diagram illustrating an Instant Messaging/Presence Service (IM/PS) server of a communication system according to an exemplary embodiment of the present invention.

FIG. 5 is a block diagram illustrating an IM/PS server of a communication system according to an exemplary embodiment of the present invention.

Referring to FIG. 5, an IM/PS server 160 includes an internet unit 510, a state communication unit 520, a memory unit 530, and a controller 540.

The internet unit 510 executes an internet communication function of the IM/PS server 160. The internet unit 510 may support interface between UEs 110 (110a, 110b) and the IM/PS server 160. Further, the internet unit 510 may support interface between an AP 140 and the IM/PS server 160.

The state communication unit 520 executes a state sharing function of the IM/PS server 150. The state communication unit 520 supports interface between the UEs 110 (110a, 110b) and the IM/PS server 160 according to an exemplary embodiment of the present invention.

The memory unit 530 may be configured by a program memory and a data memory (not shown). The program memory stores programs for controlling a general operation of the IM/PS server 160. The program memory also stores programs for controlling a general operation of the UE 110. At this time, the program memory may store programs for sharing a call state by the UEs 100 (110a, 110b). Namely, the program memory may store programs for separately sharing an internet call state and a mobile call state. The data memory executes a function storing data created during execution of the programs. The memory 530 may store state information of the respective UEs 100 (110a, 110b). In this case, the memory unit 530 may separately store presences of internet call execution and mobile call execution of the UEs 100 (110a, 110b) according to an exemplary embodiment of the present invention.

The controller 540 executes a function controlling overall operations of the IM/PS server 160. The controller 540 allows the UEs 100 (110a, 110b) to share state information through the internet unit 510 or the state communication unit 520. That is, the controller 540 may allow the UEs 100 (110a, 110b) to share presence of internet call execution. Furthermore, the controller 540 may allow the UEs 100 (110a, 110b) to share presence of mobile call execution through the state communication unit 520.

Figure 6:
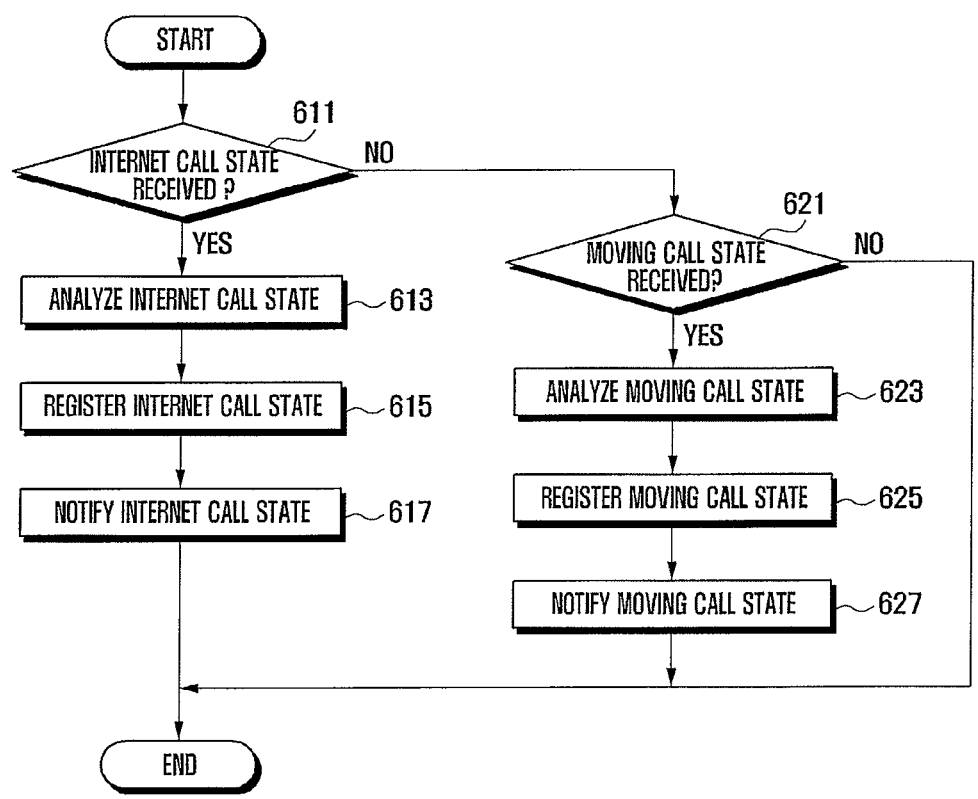
FIG. 6 is a flowchart illustrating a call providing method of an IM/PS server according to an exemplary embodiment of the present invention.

FIG. 6 is a flow chart illustrating a call providing method of an IM/PS server according to an exemplary embodiment of the present invention.

Referring to FIG. 6, in the call providing method of an IM/PS server according to this exemplary embodiment, a controller 540 first receives an internet call state through an internet unit 510 at step 611. That is, when an internet call state indicating presence of internet call execution in a specific UE 110a is received, the controller 540 detects it. Next, the controller 540 analyzes an internet call state at step 613. In this case, the controller 540 may determine whether an internet call is connected to the UE or is canceled. Further, the controller 540 may determine whether the internet call connection is then possible in the UE 110.

Subsequently, the controller 540 registers an internet call state at step 615. Namely, the controller 540 updates state information of the UE 110a in the memory unit 530. At this time, the controller 540 may change presence of the internet call execution from the state information of the UE 110a. The controller 540 may change from the state information of the UE 100a whether the internet call connection is then possible. Next, the controller 540 sends the internet call state to another UE 100b as the state information at step 617.

In the meantime, in a state that the internet call state is not received at step 611, a mobile call state can be received in the IM/PS server 160. Namely, when the mobile call state is received through a state communication unit 520, the controller 540 detects it at step 621, and analyzes a mobile call state at step 623. At this time, when a mobile call state indicating presence of mobile call execution in a specific UE 110*a* is received, the controller 540 detects it. Further, the controller 540 may determine whether the mobile call is connected to the UE 110*a* or is canceled. In addition, the controller 540 may determine whether the mobile call connection is then possible in the UE 110*a*.

Next, the controller 540 registers the mobile call state at step 625. Namely, the controller 540 updates state information of the UE 110*a* in the memory unit 530. At this time, the controller 540 may change presence of mobile call execution from the state information of the UE 110*a*. Furthermore, the controller 540 may change from the state information of the UE 110*a* whether the mobile call connection is possible. Next, the controller 540 sends the mobile call state to another UE 110*b* as state information at step 627. In this case, each time presence of the mobile call execution changes, the controller 540 may send a mobile call state of the UE 110*a* to another UE 110*b*. Meanwhile, when a predetermined period elapses, the controller 540 may send the mobile call state of the UE 110*a* to another UE 110*b*.

In the meantime, the foregoing exemplary embodiment has been described such that the UE directly notifies the internet call state to the IM/PS server. However, the present invention is not limited thereto. That is, although the UE of this example sends an internet call state to an IM/PS server through an AP, the present invention can be otherwise implemented. That is why the AP as well as the UE can determine a call state of the UE. For example, when a specific UE connects with an internet call through the AP, the AP may notify internet call connection of a corresponding UE to the IM/PS server. Meanwhile, the specific UE cancels an internet call during the internet call connection through the AP, the AP may notify the internet call cancellation of a corresponding UE to the IM/PS server.

In the meantime, the foregoing exemplary embodiment has been explained that the UE transmits or receives state information through the state communication unit. However, the present invention is not limited thereto. Namely, although the UE of this example does not receive state information through the state communication unit, the present invention may be otherwise implemented. For example, the UE may receive the state information through an internet unit or a mobile communication unit. To do this, the IM/PS server may collect state information of another UE through the state communication and transmit it through an internet unit. Further, the IM/PS server may transmit the state information of another UE using a Short Message Service (SMS) or a Multimedia Message Service (MMS). Through this, although the UE does not use a state communication unit, it may receive and provide state information of another UE. Meanwhile, the foregoing exemplary embodiment has been described assuming that the UE is a dual mode terminal However, the present invention is not limited thereto. That is, when the UE is a single mode terminal performing communication through one of a mobile communication network or an internet network, the present invention may be otherwise implemented.

For example, although the UE of this example does not use the mobile communication unit and the state communication unit, upon inclusion of an internet unit, it may share state information associated with only an internet call state with another UE through the IM/PS server. In the meantime, when the UE includes the mobile communication and the state communication unit instead of the internet unit, it may share state information associated with only a mobile call state with another UE. In a communication system and an apparatus and a method for providing a call state thereof according to the present invention, an IM/PS server allows UEs to share presences of internet call execution and mobile call execution of mobile call execution with each other. Due to this, the UE may easily determine a state of another UE to use whether to request an internet call or a mobile call from another terminal. Accordingly, since the UE can reduce the number of unnecessary internet call or mobile call connection requests, it can improve use efficiency thereof.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for providing a call state of a communication system supporting communication over a mobile communication network and an internet network, the method comprising:
   when presence of mobile call execution changes through a base transceiver station over the mobile communication network, notifying the presence of mobile call execution to an Instant Messaging/Presence Service (IM/PS) server managing presence of internet call execution over the internet network by a User Equipment (UE); and
   sending the presence of mobile call execution to another UE by the IM/PS server for the other UE to determine whether a mobile call connection to the UE is available.

2. The method of claim 1, further comprising:
   when presence of internet call execution changes through an access point supporting communication over the internet network, notifying the presence of internet call execution to the IM/PS server by the UE; and
   sending the presence of internet call execution to the other UE by the IM/PS server for the other UE to determine whether an internet call connection to the UE is available.

3. The method of claim 1, wherein the notifying of the presence of mobile call execution notifies mobile call connection to the IM/PS server by the UE when a mobile call is connected, and notifies cancellation of the mobile call to the IM/PS server by the UE when the mobile call is canceled.

4. A method for providing a call state of a User Equipment (UE) in a communication system supporting communication over a mobile communication network and an internet network, the method comprising:
   when a mobile call is connected through a base transceiver station over the mobile communication network, notifying the moving call connection to an Instant Messaging/Presence Service (IM/PS) server managing presence of internet call execution over the internet network; and
   sending cancellation of the mobile call to the IM/PS server when the mobile call is canceled.

5. The method of claim 4, further comprising analyzing and displaying state information for sending presence of a mobile call of another UE when the instant messaging/presence service server receives the state information.

6. The method of claim 4, further comprising:
   when an internet call is connected through an access point supporting communication over the internet network, notifying connection of the internet call to the IM/PS server; and
   notifying cancellation of the internet call to the IM/PS server when the internet call is canceled.

7. The method of claim 6, further comprising analyzing and displaying state information for sending presence of an internet call of another UE when the IM/PS server receives the state information.

8. A communication system supporting communication over a mobile communication network and an internet network, the communication system comprising:
- a base transceiver station for supporting communication over the mobile communication network;
- an access point for supporting communication over the internet network;
- User Equipments (UEs) for executing a mobile call through the base transceiver station and an internet call through the access point; and
- an Instant Messaging/Presence Service (IM/PS) server for managing presences of mobile call execution and internet call execution of the UEs that allows the UEs to share the presences of mobile call execution and internet call execution for one of the UEs to determine whether a mobile call connection or an internet call connection to other UEs is available.

9. An apparatus for providing a call state of a User Equipment (UE) in a communication system supporting communication over a mobile communication network and an internet network, the apparatus comprising:
- a mobile communication unit for executing a mobile call through a base transceiver station for supporting communication over the mobile communication network;
- a state communication unit for communicating presence of the mobile call execution with an Instant Messaging/Presence Service (IM/PS) server managing presence of the internet call execution over the internet network; and
- a controller for controlling the IM/PS server to notify the presence of the mobile call execution when the presence of the mobile call execution changes for another UE to determine whether a mobile call connection to the UE is available.

10. The apparatus of claim 9, wherein the controller controls analyzing and displaying state information for sending presence of a mobile call of another UE when the IM/PS server receives the state information.

11. The apparatus of claim 9, further comprising an internet unit for executing an internet call through an access point supporting communication over the internet network, and for notifying presence of internet call execution to the IM/PS server under control of the controller for another UE to determine whether an internet call connection to the UE is available.

12. The apparatus of claim 11, wherein the controller controls analyzing and displaying state information for sending presence of an internet call of another user equipment when the instant messaging/presence service server receives the state information through the internet unit.

13. An apparatus for providing a call state of an Instant Messaging/Presence Service (IM/PS) server in a communication system supporting communication over a mobile communication network and an internet network, the apparatus comprising:
- a state communication unit for detecting whether User Equipments (UEs) execute a mobile call through a base transceiver station supporting communication over the mobile communication network;
- an internet unit for detecting whether UEs execute an internet call through an access point supporting communication over the internet network; and
- a controller for managing presence of the mobile call execution of the UEs to share the presence of the mobile call execution by the UEs for one of the UEs to determine whether a mobile call connection to other UEs is available, and for managing presence of the internet call execution of the UEs to share the presence of the internet call execution by the UEs for the one of the UEs to determine whether an internet call connection to the other UEs is available.

* * * * *